United States Patent [19]

Terabe et al.

[11] Patent Number: 4,643,921
[45] Date of Patent: Feb. 17, 1987

[54] SIMULATED MARBLE ARTICLE

[75] Inventors: Seiji Terabe, Tokoname; Kazuo Ito, Tokai, both of Japan

[73] Assignee: Inax Corporation, Aichi, Japan

[21] Appl. No.: 759,429

[22] Filed: Jul. 26, 1985

[30] Foreign Application Priority Data

Jul. 27, 1984 [JP] Japan ................................ 59-158188
Aug. 24, 1984 [JP] Japan ................................ 59-177141

[51] Int. Cl.$^4$ ......................... C08K 3/10; C08K 3/34; B32B 33/00; C09D 5/29
[52] U.S. Cl. ..................... 428/15; 523/171; 523/220; 524/444; 524/449; 524/451; 524/789
[58] Field of Search ................. 428/15; 523/171, 220; 524/789, 444, 449, 451

[56] References Cited

U.S. PATENT DOCUMENTS

| | | | |
|---|---|---|---|
| 3,405,088 | 10/1968 | Slocum | 524/425 |
| 3,847,865 | 11/1974 | Duggins | 524/437 |
| 4,085,246 | 4/1978 | Buser et al. | 428/15 |
| 4,159,301 | 6/1979 | Buser | 523/220 |
| 4,235,948 | 11/1980 | Holmes | 428/15 |
| 4,267,229 | 5/1981 | Knight | 523/171 |
| 4,413,089 | 11/1983 | Gavin et al. | 524/435 |
| 4,446,177 | 5/1984 | Munoz et al. | 428/15 |

FOREIGN PATENT DOCUMENTS

| | | | |
|---|---|---|---|
| 0104621 | 9/1978 | Japan | 523/171 |
| 0022163 | 2/1982 | Japan | 524/789 |
| 0033308 | 2/1984 | Japan | 523/171 |

OTHER PUBLICATIONS

Condensed Chemical Dictionary, 7th Ed., Reinhold Publishing, 1966, p. 105, "Bentonite".

Primary Examiner—Herbert J. Lilling
Attorney, Agent, or Firm—Michael N. Meller

[57] ABSTRACT

Improved resistance to abrasion, high transparency and a high quality appearance, are obtained by incorporating a filler of an amorphous hydrated silicate having an average particle size of 1 μm or less and by a difference of the refractive index between the filler and a resin matrix in a range of 0.00 to 0.05, preferably 0.01 to 0.03.

18 Claims, 1 Drawing Figure

SIMULATED MARBLE ARTICLE

BACKGROUND OF THE INVENTION

1. Field of the Invention

The present invention relates to a simulated marble article. In particular, it relates to a simulated marble article having a high resistance to abrasion and a high transparency.

2. Description of the Related Art

Heretofore, simulated marble articles of resin concrete comprising a resin matrix of, e.g., polyester or acrylic resin, and a filler of, e.g., calcium carbonate, calcium sulfate, clay, silica, calcium silicate, and alumina trihydrate, are known (see: U.S. Pat. Nos. 3,405,088 and 3,847,865). Such simulated marble articles are used as building products, kitchen and bathroom counter tops, table plates, dresser tops, vanity tops, shelving, wainscoting, and baths, among others.

Generally, simulated marble articles of resin concrete are produced by adding a prepolymer with a polymerization initiator, a filler and other additives, mixing these ingredients, and effecting vacuum degassing to obtain a mixture in the form of a slurry. The filler has a particle size of between several micrometers and 0.5 millimeter. The mixture in the form of a slurry is poured into a mold and allowed to stand at a room temperature or heated at a raised temperature to cure the slurry. The resultant shaped article is then subjected to cutting, bending by heat, lamination, surface finishing, etc. to obtain the above-mentioned kitchen and bathroom counter tops, table plates, dresser tops, baths, etc.

In the prior art, resin concretes comprise, as a filler, an inorganic powder having a relatively large particle size of several micrometers to 0.5 millimeter and, therefore, adhesion between the filler and a resin matrix is weak, resulting in the filler becoming detached by scratching, abrasion, etc. To eliminate this defect, a hard coating or a gel coating is formed on the surface of a resin concrete, which complicates the production process and thereby increases the cost.

Hard coating of the article, for improving the resistance to abrasion, is carried out by optionally first precoating the surface of a resin concrete body with a primer; then coating that surface with a solvent-diluted hard coating agent such as an organosilane hard coating agent and polyfunctional acrylic hard coating agent; drying the article to remove the solvent from the coating; and curing the resultant article by heating, or ultraviolet (UV) radiation etc. The above hard coating process has a problem in that it involves several processing steps. Further, control of the temperature and humidity after coating a hard coating agent on the surface of a resin concrete body is difficult since the solvent must be gradually removed from the coated layer to ensure that cracks do not appear, and thus entails the need to use large-scale air conditioning equipment. Moreover, the characteristics of hard coating agents limit the thickness of the hard coating layer to an extremely thin thickness of from 3 to 8 $\mu$m, resulting in insufficient hardness and strength of the coating layer. Further, the adhesion between the substrate of the resin. concrete body and the hard coating layer is insufficient except for a limited combination thereof, and thus it is likely that the coating layer will be easily peeled from the substrate.

Another way to improve resistance to abrasion is gel coating, which is generally carried out for aesthetic and protective purposes on shaped articles of resin concrete, fiber reinforced plastics, etc. For example, in the above process, isophthalic acid series are used for polyester resins. In this process, a resin layer which does not contain glass fibers but may contain a filler such as calcium carbonate, silica etc. is formed on the surface of a mold and, after gelation occurs, a lamination process is carried out to produce a shaped article with a gel coating layer. A shaped article with a gel coating layer has excellent resistance to water, resistance to chemicals, and a high mechanical strength.

However, the lamination process must be carried out after the gelation of a gel coating layer, making the shaping process complicated. In particular, it is difficult to provide a molded article with a gel coating layer by a single shaping process and layer-peeling is likely to occur due to insufficient adhesion.

Furthermore, it is desirable to establish a high transparency of a resin concrete to give, to a simulated marble article, an appearance of high quality, preferably while allowing various resin materials and additives to be used in order to obtain the desired properties of a resin matrix or a simulated marble article for various applications.

SUMMARY OF THE INVENTION

The object of the present invention is to eliminate the problems described above and to provide a simulated marble article which has improved resistance to abrasion and a higher transparency and may be produced by a simple process.

These and other objects, features and advantages of the present invention are attained by a simulated marble article, comprising a filler distributed in a resin matrix, characterized in that the filler is of amorphous hydrated silicate particles having an average particle size of 1 $\mu$m or less in an amount of 30% to 70% by weight of the total weight of a filler and a resin matrix or a resin concrete, the difference between the refractive indexes of the filler and the resin matrix being in a range of 0.00 to 0.05, preferably 0.01 to 0.03.

Simply by reducing the particle size of a filler in a resin concrete to 1 $\mu$m or less, the resistance to abrasion of a resin concrete, i.e., a simulated marble article, can be remarkably improved and peeling of the filler can be prevented. If a filler has an average particle size of more than 1 $\mu$m, the filler is easily peeled from the surface of a resin concrete or a simulated marble article and the resistance to abrasion of a resin concrete is insufficient.

The amount of filler should be in a range of from 30% to 70% by weight of the total weight of a filler and a resin matrix, or a resin concrete. Less than 30% by weight of a filler cannot attain a desired increase of the mechanical strength of a resin concrete, while more than 70% by weight of a filler degrades the moldability and deteriorates the characteristics such as bending and resistance to abrasion of a resin concrete.

The transparency of a resin concrete, i.e., a simulated marble article, may be improved by reducing the difference of the refractive indexes between the filler and the resin matrix. To obtain an appearance of a natural marble, the presence of a slight difference of the refractive indexes between the filler and the resin matrix is, however, necessary. Thus, a difference between the refractive indexes of the filler and the resin matrix in a range of 0.00 to 0.05, preferably 0.01 to 0.03 gives a desirable higher transparency and high quality to a simulated marble article.

A filler of an amorphous hydrated silicate is suitable as a filler in a simulated marble article since the material has a suitable color, white, and an appropriate refractive index close to that of a resin matrix, which allows the attainment of a certain transparency and a high quality. Although a colorant may be added to give an article a similar color to marble, it can not attain this certain transparency and high quality.

Furthermore, an amorphous filler is advantageous since it has a constant refractive index irrespective of direction, allowing a high transparency and thus a high quality. Crystalline fillers, which have been used as a filler in resin concretes in the prior art, have different refractive indexes depending on direction, which makes it difficult to adjust the refractive index of the filler to be different by only 0.00 to 0.05, preferably 0.01 to 0.03 from that of a resin matrix, since particles of the filler have a range of the refractive indexes in different directions.

Further, the refractive index of an amorphous hydrated silicate can be adjusted to be in a certain range, which allows the use of a certain range of resin materials as a resin matrix without losing a high transparency and high quality of a resin concrete, i.e., a simulated marble article. This cannot be attained by a crystalline material which has a fixed refractive index. In practice, the desired shrinkage, hardness, flexibility, chemical resistance, water-proofing property, heat resistance, mechanical strength, etc. of a simulated marble article are made depending on the production process and various applications by selecting a resin material, additives such as a cross-linking agent, an accelerating agent, a parting agent, a colorant, etc. When a particular resin material and additives are selected, the refractive index of a resin matrix is fixed. In such a case, a filler of an amorphous hydrated silicate has an advantage that the refractive index of the filler may be selected to be different by 0.00 to 0.05, preferably 0.01 to 0.03 from that of the certain resin matrix by selecting a particular composition of an amorphous hydrated silicate.

An amorphous hydrated silicate can be expressed by the general formula: $x(M_aO_b).y(SiO_2).nH_2O$, wherein M is a metal such as B, Be, Mg, Ca, Ba, Al, Zn, Ti, Zr and Sn; a is 1 or 2; b is 1, 2 or 3; $n>0$; $x \geq 0$; and $y \geq 0$.

The amorphous hydrated silicate used in the invention may contain a small amount of impurities such as other metal oxides, hydroxides, carbonates etc.

Of the above metals, Al, Mg, Ca and the like are preferable, due to costs and to the controllability of the refractive index of an amorphous hydrated silicate.

Examples of ranges of the refractive index of some amorphous hydrate silicates are as below: Amorphous hydrated aluminum silicate ($xAl_2O_3.ySiO_2.nH_2O$, wherein $0 \leq x/y \leq 0.75$, preferably $0.05 \leq x/y \leq 0.50$) may have a refractive index in a range of 1.47 to 1.54. Amorphous hydrated magnesium silicate ($xMgO.ySiO_2.nH_2O$, where $0 \leq x/y \leq 1.50$, preferably $0.1 \leq x/y \leq 0.75$) may have a refractive index in a range of 1.47 to 1.50. Amorphous hydrated calcium silicate ($xCaO.ySiO_2.nH_2O$, wherein $0 \leq x/y \leq 1.25$, preferably $0.1 \leq x/y \leq 1.00$) may have a refractive index in a range of 1.47 to 1.56. The respective preferable ranges of x/y in the above formulas also give the above respective ranges of the refractive index.

The amorphous hydrated silicate used in the invention may be produced by hydrothermal synthesis, a sol-gel method using metal alkoxides, and chemical co-precipitation using water glass etc. The primary particles of the thus obtained amorphous hydrated silicate have an average particle size of 1 μm or less, and some of these form agglomerates or secondary particles having an average particle size of 5 to 20 μm. The effect of the invention, that is, an improved abrasion resistance, however, may be attained by using as a filler amorphous hydrated silicate particles having an average particle size of the primary particles of 1 μm or less.

Although a filler used in the present invention should have an average particle size of 1 μm or less, part of the filler may be replaced by glass powder, to increase the transparency and surface hardness and to decrease the production cost, in an amount which will not deteriorate the resistance to abrasion of a simulated marble article. Glass powder is difficult to divide into an average particle size such as 1 μm or less but has good transparency and a higher hardness and is cheap, and thus is suitable as an addition as part of a filler. Glass powder may easily have a transparency in a range of 1.46 to 1.60. Such a glass powder has an average particle size of 10 to 50 μm. A weight ratio of the glass powder to a fine filler (1 μm or less) should be in a range of between 1:10 and 3:2, preferably between 1:4 and 2:3.

Further, a part or all of the filler in a portion of the resin matrix remote from a surface of the simulated marble article, where improvement of the abrasion resistance is not necessary, may be replaced by another filler having an average particle size of 10 μm or more. The portion of the resin matrix where the abrasion resistance is to be improved is only a thin layer adjacent to a certain surface of the simulated marble article. Therefore, a part or all of the filler distributed in the portion other than the above-mentioned thin layer may be replaced by a cheaper filler or a filler having larger-sized particles. This partial replacement may also enhance the aesthetic effect based on the two layer structure. The larger-sized particle filler, having an average particle size of 10 μm or more, may be calcium carbonate, silica sand, glass powder, etc.

The resin matrix of a simulated marble article according to the present invention is not new and may comprise any resin used in the prior art, including acrylic resins such as methyl metacrylate polymers, polyester resins such as unsaturated polyester resin, etc. (see, for example, U.S. Pat. No. 3,847,865).

Examples of the resin materials which may be used in the invention have a refractive index as shown below:
polymethylmethacrylate—1.49; polystyrene—1.60; a copolymer of styrene and methacrylate—1.50 to 1.59; a copolymer of styrene and acrylate—1.43 to 1.59; a copolymer of methacrylate and acrylate—1.43 to 1.69; a blend thereof—1.43 to 1.60; an epoxy resin—1.55 to 1.60; and a polyester—1.52 to 1.58.

A simulated marble article of a resin concrete according to the present invention may further contain other additives such as coupling agents, colorants, and parting agents (lubricants), etc. When glass powder is incorporated in a resin concrete, it is preferable to also add a coupling agent such as a silane coupling agent and a titanium coupling agent.

DESCRIPTION OF THE PREFERRED EMBODIMENT

Figure 1:
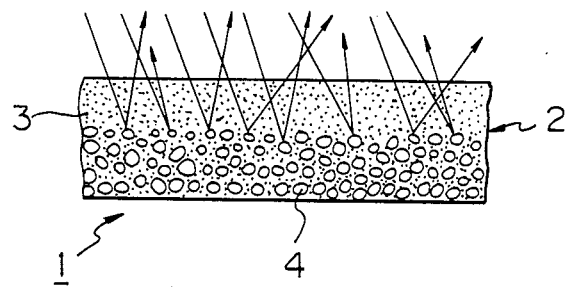
FIG. 1 is a section of a simulated marble article in an embodiment of the present invention.

Production of a simulated marble article according to the invention may be carried out by adding a resin material such as acrylic prepolymer with from 0.01 to 1.0% by weight of polymerization initiator and from 30% to 70% by weight of a filler of an amorphous hydrated silicate having an average particle size of 1 μm or less and, optionally, a cross-linking agent, a coupling agent, a parting agent, a reaction accelerating agent, and a colorant, etc.; mixing these ingredients with stirring; degassing the mixture to obtain a compound in the form of a slurry; pouring the compound into a mold; and curing the mold by heating to obtain a shaped article, i.e., a simulated marble article.

Formation of the resin matrix is determined based on considerations of required refractive index, polymerization rate, and properties of polymer etc. Examples of the refractive indexes of typical resin materials have been listed before. Polymers from polymerizable monomers or oligomers containing an aromatic ring, chlorine, bromine etc. in the molecule thereof have a larger refractive index while those containing fluorine in the molecule thereof have a lower refractive index. These factors may be used to adjust a desired refractive index of a resin matrix. The resin matrix used is also selected to have a required transparency, and high mechanical strengths such as bending strength, stretching strength, and impact resistance, and high durability to factors such as chemical resistance and weather resistance. The resin matrix is also required to have a good affinity with a filler of an amorphous hydrated silicate.

A polymerizable syrup used in the invention is generally a blend of polymerizable monomers and oligomers.

The viscosity of the resin material used is preferably in the range of between 50 cp and 300 cp. In a resin material having a viscosity lower than 50 cp, fine filler particles having an average size of 1 μm or less would precipitate, which does not allow an increase in the resistance to abrasion of the surface layer of the resin concrete. In a resin material having a viscosity higher than 300 cp, a large amount of filler cannot be incorporated, which also does not allow an increase in the resistance to abrasion of the surface layer of the resin concrete.

Preferable polymerization initiators used are organic peroxide series such as benzoyl peroxide (BPO), lauroyl peroxide (LPO) and diisopropyl peroxy dicarbonate (IPP), and azobis-system radical polymerization initiators such as 2,2′-azobisisobutyronitrile (AIBN). Less than 0.01% by weight of a polymerization initiator will not allow polymerization or will need too long a period of time for polymerization even if polymerization is allowed. More than 1.0% by weight of a polymerization initiator may cause foaming of the resin material due to heat generated during polymerization.

In production, a polymerization initiator is added and dissolved in a resin material, in which a filler and optionally additives such as a cross-linking agent, a parting agent, a reaction accelerator, a coupling agent, and a colorant are then added and mixed in a mixer. The mixture is vacuum degassed to obtain a compound in the form of slurry. The slurry is then poured into a conventional mold such as a glass mold, an FRP mold or a metal mold and, cured by heat. The heating conditions comprise a temperature in a range of from room temperature to 80° C. and a period of time in a range of from 0.5 to 30 hours, preferably from 1 to 10 hours.

Replacement of a part or all of a fine filler of an amorphous hydrated silicate in a portion of a resin matrix remote from a surface of a simulated marble article by a coarse filler may be done by precipitating the fine and coarse fillers in a slurry of a resin matrix for a certain period and then curing it. The separation of fine and coarse fillers is based on a difference of the precipitation speeds of the fillers. The precipitation speed of a particle may be expressed by the following Stokes' law:

$$V = \frac{g(\rho_s - \rho)d^2}{18\mu}$$

wherein,
V: precipitation speed
μ: viscosity of resin
g: acceleration of gravity
$\rho_s$: density (specific weight) of particle
$\rho$: density (specific weight) of resin
d: particle size As seen in the above equation, the difference of precipitation speeds of different particles depends on the particle sizes of the particles by the square thereof, as well as on the densities of the particles, the viscosity of the resin etc. Thus, the use of two fillers having average particle sizes of 1 μm or less and 10 μm or more respectively is sufficient to obtain a two layer structure in a resin concrete in which only a fine filler having an average particle size of 1 μm or less is present in a portion of a resin matrix near a surface of a simulated marble article, but both fine and coarse fillers having average particle sizes of 1 μm or less and 10 μm or more respectively are present in a portion of the resin matrix remote from the surface of the simulated marble article. Of course, the selection of desired densities of the two fillers and the like, to accelerate formation of a two layer structure, is preferable for improving the production efficiency from 0.5 to 30 hours, in particular allowing to stand from 1 to 10 hours to cause precipitation of a coarse filler is preferable for practical production.

In production, after a polymerization initiator is added and dissolved in a resin material, fine and coarse fillers and, optionally, additives such as a cross-linking agent, a parting agent, a reaction accelerator, etc. are added and mixed in a mixer. The mixture is vacuum degassed to obtain a compound in the form of a slurry, which is then poured into a conventional mold such as a glass mold, an FRP mold or a metal mold and cured by heat. Here, the mold is allowed to stand for a certain period to effect necessary precipitation, followed by curing with heat. The heating temperature ranges in a range of from room temperature to 80° C. The heating may be carried out during the standing for precipitation. A heating period of 0.5 to 30 hours is sufficient.

FIG. 1 illustrates a section of a simulated marble article having a thus-obtained two layer structure, in which 1 denotes the article as a whole, 2 a resin matrix, 3 a fine filler, and 4 a coarse filler. In this article, the refractive indexes of the fine filler 3 and the resin matrix 2 are different by only a range of 0.00 to 0.05, preferably 0.01 to 0.03, according to the present invention, allowing a high transparency. Thus, incident light passes through the surface layer and is irregularly reflected by the coarse filler 4 or a deep portion of the article, giving a deep transparency, a high quality, and a particular aesthetic effect.

EXAMPLES

According to a process described before, 11 types of simulated marble articles were produced. The compositions used and the conditions of molding are shown in Table 1. Samples 1 to 7 belong to the present invention. Samples 8 to 11 are comparative examples. In the experiments, the amorphous magnesium silicate hydrate used had the formula: $2MgO.3SiO_2.xH_2O$, and the amorphous aluminum silicate hydrate had the formula: $Al_2O_3\ 13SiO_2.xH_2O$. Sample 7 was prepared by molding a polymerizable slurry containing fine and coarse fillers, i.e., amorphous magnesium silicate hydrate having an average particle size of 0.2 μm and calcium carbonate having an average particle size of 60 μm, in a glass mold, followed by heating it at 60° C. for 7 hours, during which separation of the coarse filler and curing of the resin matrix occurred. This sample had a surface layer in the resin concrete wherein only a fine filler of amorphous magnesium silicate was present, the thickness ratio of the resin concrete to the surface layer being 2:1.

The resistance to abrasion and percent of light transmittance of the obtained simulated marble articles were examined. The resistance to abrasion was measured by a taber abrasion test according to JIS K6902. The percent of light transmittance was determined from the amount of light transmitted through a sample having a thickness of 0.4 mm when irradiated with white light.

In Table 1, "amount" is based on parts by weight, and "index" means refractive index.

TABLE 1

| Sample No. | Resin Material Viscosity | Resin Material Amount | Index of Cured Resin | Filler Average Particle size | Filler Index | Filler Amount | Additive | Additive Amount |
|---|---|---|---|---|---|---|---|---|
| 1 | Acrylic Prepolymer 180 cp | 70 | 1.49 | Magnesium Silicate Hydrate 0.2 μm | 1.50 | 30 | BPO | 0.02 |
| 2 | Acrylic Prepolymer 130 cp | 50 | 1.49 | Magnesium Silicate Hydrate 0.2 μm | 1.50 | 50 | BPO | 0.04 |
| 3 | Acrylic Prepolymer 90 cp | 30 | 1.49 | Magnesium Silicate Hydrate 0.2 μm | 1.50 | 70 | BPO | 0.06 |
| 4 | Acrylic Prepolymer 180 cp | 50 | 1.49 | Aluminum Silicate Hydrate 0.3 μm | 1.51 | 50 | BPO | 0.05 |
| 5 | Acrylic Prepolymer 180 cp | 50 | 1.49 | Magnesium Silicate Hydrate 0.2 μm | 1.50 | 20 | BPO | 0.05 |
|  |  |  |  | Glass Powder 12 μm | 1.52 | 20 | Silane Coupling Agent | 0.15 |
| 6 | Acrylic Prepolymer 180 cp | 50 | 1.49 | Aluminum Silicate Hydrate 0.3 μm | 1.51 | 30 | BPO | 0.05 |
|  | 180 cp |  |  | Glass Powder 15 μm | 1.52 | 20 | Silane Coupling Agent | 0.1 |
| 7 | Acrylic Prepolymer 150 cp | 40 | 1.49 | Magnesium Silicate Hydrate 0.2 μm | 1.50 | 20 | BPO | 0.05 |
|  |  |  |  | Calcium Carbonate 60 μm | 1.66 | 40 |  |  |
| 8 | Acrylic Prepolymer 130 cp | 50 | 1.49 | Aluminum Silicate Hydrate 17 μm | 1.51 | 50 | BPO | 0.04 |
| 9 | Acrylic Prepolymer 110 cp | 50 | 1.49 | Magnesium Silicate Hydrate 20.0 μm | 1.50 | 50 | BPO | 0.04 |
| 10 | Acrylic Prepolymer 110 cp | 30 | 1.49 | Aluminum Hydroxide 17.0 μm | 1.56 | 70 | BPO | 0.06 |
| 11 | Acrylic Prepolymer 11 cp | 30 | 1.49 | Calcium Carbonate 15.0 μm | 1.66 | 70 | BPO | 0.06 |

| Sample | Composition and Conditions of Molding Heating Temp. | Composition and Conditions of Molding Heating Time | Test of Result Resistance to Abrasion (g/100) | Test of Result Percent of Light Transmittance |
|---|---|---|---|---|

TABLE 1-continued

| No. | Mold | (°C.) | (hr) | rotation | (%) |
|---|---|---|---|---|---|
| 1 | Glass Mold | 60 | 6 | 0.041 | 75.9 |
| 2 | Glass Mold | 60 | 5 | 0.040 | 72.4 |
| 3 | Glass Mold | 60 | 4 | 0.045 | 69.2 |
| 4 | Glass Mold | 60 | 5 | 0.023 | 47.9 |
| 5 | Glass Mold | 60 | 5 | 0.041 | 71.2 |
| 6 | Glass Mold | 60 | 5 | 0.027 | 46.0 |
| 7 | Glass Mold | 60 | 7 | 0.040 | — |
| 8 | Glass Mold | 60 | 5 | 0.091 | 44.0 |
| 9 | Glass Mold | 60 | 5 | 0.105 | 74.0 |
| 10 | Glass Mold | 60 | 4 | 0.117 | 39.8 |
| 11 | Glass Mold | 60 | 4 | 0.087 | 31.6 |

From Table 1, it is clearly seen that the resistance to abrasion abruptly increases when the average particle size of the filler becomes smaller than 1.0 μm. These effects are considered to derive from the fine particle sizes of a filler, which enlarge the specific surface area of the filler and thus increase the adhesion of the filler to the resin matrix, and from a dense filling of the filler in the resin concrete. Further, it is seen that the transparency increases when the difference of the refractive index between a resin matrix and a filler is controlled to be low or in a range of 0.00 to 0.05, preferably 0.01 to 0.03. Generally, a difference of transparency of a few percent at a transparency of around 40% is important and can be clearly distinguished by the naked eye, and a difference of about ten percent or more at a transparency of more than 50% or less than 30% is less important. Therefore, all increases of the transparency, seen in Table 1, according to the present invention, are sufficiently advantageous. Thus, the present invention gives an improved transparency and a high quality to a simulated marble article.

We claim:

1. A simulated marble article, comprising a filler distributed in a resin matrix, wherein said filler comprises amorphous hydrated silicate particles having an average particle size of 1 μm or less in an amount of 30% to 70% by weight of the total weight of said filler and said resin matrix, the difference between the refractive indexes of said filler and said resin matrix being in a range of 0.00 to 0.05.

2. A simulated marble article according to claim 1, wherein said difference between the refractive indexes of said filler and said resin matrix is in a range of 0.01 to 0.03.

3. A simulated marble article according to claim 1, wherein said amorphous hydrated silicate has the general formula: $x(M_aO_b) \cdot y(SiO_2) \cdot nH_2O$, wherein M is a metal selected from the group consisting of B, Be, Mg, Ca, Ba, Al, Zn, Ti, Zr, and Sn; a is 1 or 2; b is 1, 2 or 3; $n > 0$; $x \geq 0$; and $y \geq 0$.

4. A simulated marble article according to claim 3, wherein said amorphous hydrated silicate is $xAl_2O_3 \cdot ySiO_2 \cdot nH_2O$, wherein $0 \leq x/y \leq 0.75$.

5. A simulated marble article according to claim 4, wherein $0.05 \leq x/y \leq 0.50$.

6. A simulated marble article according to claim 3, wherein said amorphous hydrated silicate is of $xMgO \cdot ySiO_2 \cdot nH_2O$, wherein $0 \leq x/y \leq 1.50$.

7. A simulated marble article according to claim 4, wherein $0.1 \leq x/y \leq 0.75$.

8. A simulated marble article according to claim 4, wherein said amorphous hydrated silicate is of $xCaO \cdot ySiO_2 \cdot nH_2O$, wherein $0 \leq x/y \leq 1.25$.

9. A simulated marble article according to claim 8, wherein $0.1 \leq x/y \leq 1.00$.

10. A simulated marble article according to claim 1, wherein said filler has an average particle size of 0.6 μm or less.

11. A simulated marble article according to claim 1, wherein said resin matrix is selected from the group consisting of an acrylic resin, an epoxy resin and a polyester resin.

12. A simulated marble article according to claim 1, wherein said resin matrix is selected from the group consisting of a copolymer of a methacrylate and styrene; a copolymer of an acrylate and styrene; a copolymer of a methacrylate and an acrylate; and a blend thereof.

13. A simulated marble article according to claim 1, further comprising additives selected from the group consisting of a coupling agent and a colorant.

14. A simulated marble article according to claim 1, wherein a part of said filler is replaced by glass powder having an average particle size of 10 to 50 μm and the weight ratio of said glass powder to said filler is between 1:10 to 3:2.

15. A simulated marble article according to claim 14, wherein the weight ratio of said glass powder to said filler is between 1:4 and 2:3.

16. A simulated marble article according to claim 14, further comprising additives selected from the group consisting of a coupling agent and a colorant.

17. A simulated marble article according to claim 1, wherein at least a part of said filler near a surface of said simulated marble article consists essentially of amorphous hydrated silicate particles having an average particle size of 1 μm or less.

18. A simulated marble article according to claim 17, wherein at least a part of said filler distributed in a portion of said resin matrix remote from a surface of said simulated marble article is replaced by another filler having an average particle size of 10 μm or more.

* * * * *